United States Patent
Tamaru

(10) Patent No.: US 7,728,881 B2
(45) Date of Patent: Jun. 1, 2010

(54) COLOR SIGNAL CORRECTING METHOD, APPARATUS, AND PROGRAM

(75) Inventor: Masaya Tamaru, Asaka (JP)

(73) Assignee: Fujifilm Corporation, Tokyo (JP)

( * ) Notice: Subject to any disclaimer, the term of this patent is extended or adjusted under 35 U.S.C. 154(b) by 878 days.

(21) Appl. No.: 11/259,115

(22) Filed: Oct. 27, 2005

(65) Prior Publication Data

US 2006/0092485 A1    May 4, 2006

(30) Foreign Application Priority Data

Oct. 29, 2004   (JP)   ............................. 2004-316857

(51) Int. Cl.
| | |
|---|---|
| H04N 5/228 | (2006.01) |
| H04N 9/73 | (2006.01) |
| H04N 3/14 | (2006.01) |
| H04N 5/335 | (2006.01) |
| H04N 9/04 | (2006.01) |
| G06K 9/00 | (2006.01) |

(52) U.S. Cl. ................. 348/223.1; 348/222.1; 348/273; 382/162; 382/167

(58) Field of Classification Search ................. 348/272, 348/273, 207.99, 222.1, 223.1, 659, 661; 382/162, 167
See application file for complete search history.

(56) References Cited

U.S. PATENT DOCUMENTS

| | | | | |
|---|---|---|---|---|
| 6,480,625 | B1 * | 11/2002 | Yamazaki | ................... 382/167 |
| 6,630,956 | B1 * | 10/2003 | Toi | ............................... 348/273 |
| 6,934,050 | B2 * | 8/2005 | Merrill et al. | .............. 358/1.16 |
| 2002/0025069 | A1 | 2/2002 | Endo et al. | |
| 2002/0113195 | A1 | 8/2002 | Osada | |
| 2003/0184652 | A1 * | 10/2003 | Tanaka et al. | ............ 348/207.1 |
| 2004/0061790 | A1 * | 4/2004 | Tanji et al. | ............... 348/222.1 |
| 2004/0262493 | A1 * | 12/2004 | Suzuki | .................... 250/208.1 |
| 2005/0231620 | A1 * | 10/2005 | Fraenkel et al. | ............. 348/308 |

FOREIGN PATENT DOCUMENTS

| | | |
|---|---|---|
| JP | 11-122525 A | 4/1999 |
| JP | 11-298909 A | 10/1999 |
| JP | 2001-320722 A | 11/2001 |
| JP | 2002-191053 A | 7/2002 |

OTHER PUBLICATIONS

Japanese Office Action No. JP-2004-316857 issued Aug. 20, 2009.

* cited by examiner

*Primary Examiner*—David L Ometz
*Assistant Examiner*—Richard M Bemben
(74) *Attorney, Agent, or Firm*—Birch, Stewart, Kolasch & Birch, LLP

(57) ABSTRACT

A color signal correcting method for correcting a color signal of each pixel outputted from a single-plate color image pickup element having a given color filter arrangement to correct a color reproduction error in an image, comprising the steps of:

computing color signals of filter colors other than a filter color at the spatial location of a pixel to be corrected, wherein the other color signals at the spatial location are computed on the basis of color signals of a plurality of pixels of the same filter color located around the pixel to be corrected; and obtaining a correction value by multiplying the color signal of the pixel to be corrected and the computed other color signals by a predetermined correction coefficient and combining the products.

6 Claims, 8 Drawing Sheets

FIG.2A — RELATION BETWEEN PIXELS ON CCD

FIG.2B — POSITIONAL RELATION BETWEEN READ PIXELS

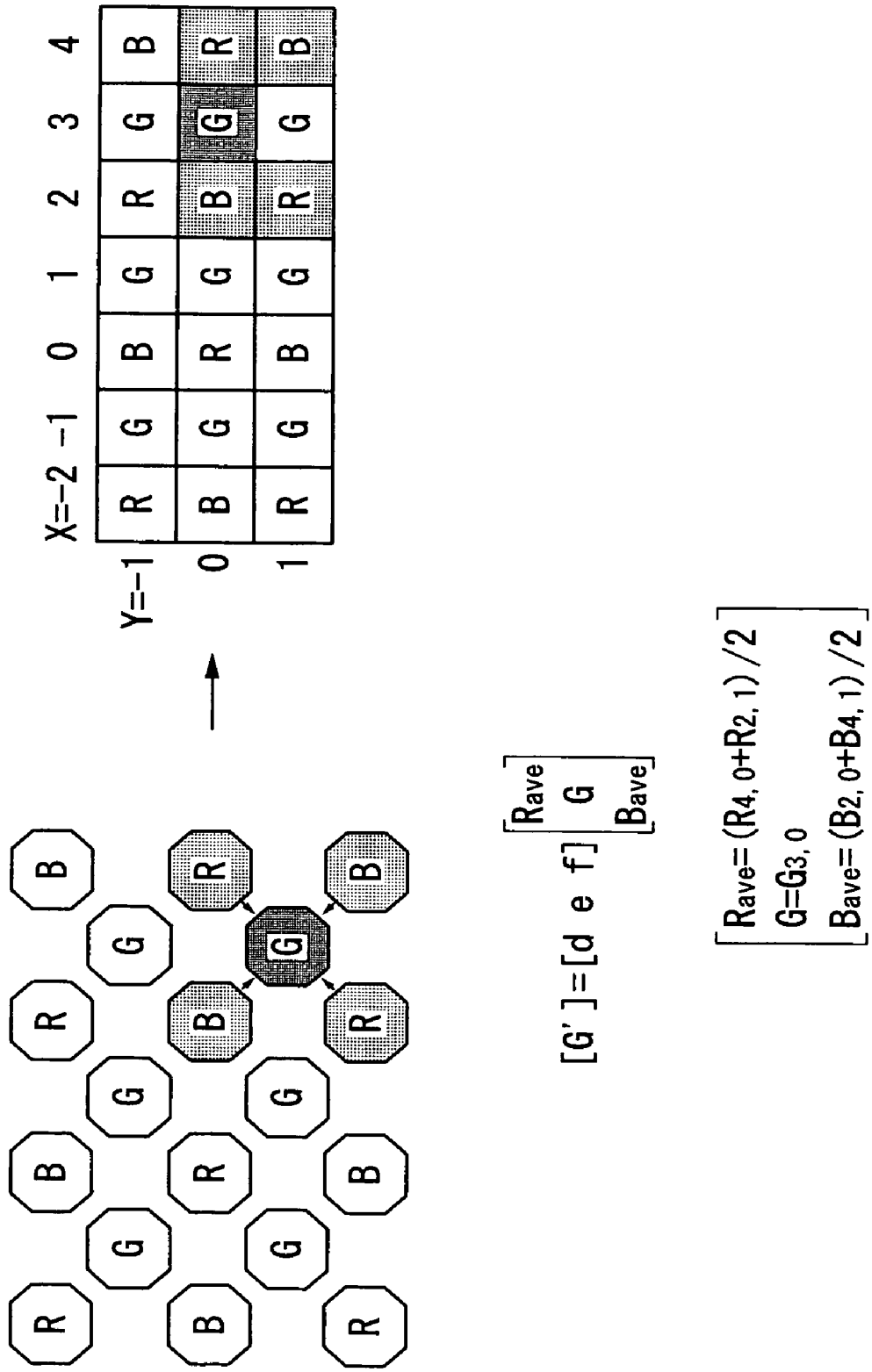

COLOR SIGNAL CORRECTING METHOD, APPARATUS, AND PROGRAM

BACKGROUND OF THE INVENTION

1. Field of the Invention

The present invention relates to a color signal correcting method, apparatus, and program and, in particular, to a color signal correcting method, apparatus, and program for correcting color reproduction errors in image signals outputted from a single-plate color image pickup element having a given color filter arrangement.

2. Description of the Related Art

Color imaging apparatuses such as video cameras and digital cameras generally include a color reproduction correcting circuits, which applies linear matrix processing to image signals to improve the color reproduction of a subject. The linear matrix processing is conventionally performed after interpolation of R, G, and B dot sequential color signals outputted from an image pickup element. After the interpolation, the color image signals are corrected according to the following equation so as to match a desired color space (for example, Japanese Patent Application Laid-Open No. 11-298909).

$$\begin{pmatrix} R' \\ G' \\ B' \end{pmatrix} = \begin{pmatrix} a & b & c \\ d & e & f \\ g & h & i \end{pmatrix} \begin{pmatrix} R \\ G \\ B \end{pmatrix} \quad \text{[Formula 1]}$$

SUMMARY OF THE INVENTION

In conventional color imaging apparatuses, linear matrix processing is applied to image signals after subjected to interpolation. The conventional imaging apparatus have the following drawback: if linear matrix processing is to be performed on R, G, B dot sequential color signals before interpolation, information on color signals of neighboring pixels must be used in order to obtain information on missing color signals, which involves computations on pixels in different spaces and therefore spurious signals are likely to be generated at color boundaries of a subject.

The present invention has been made in light of these circumstances and an object of the present invention is to provide a color signal correcting method, apparatus, and program capable of reducing generation of spurious signals.

In order to attain the above-described object, the present invention according to a first aspect provides a color signal correcting method for correcting a color signal of each pixel outputted from a single-plate color image pickup element having a given color filter arrangement to correct a color reproduction error in an image, including the steps of: computing color signals of filter colors other than a filter color at the spatial location of a pixel to be corrected, wherein the other color signals at the spatial location are computed on the basis of color signals of a plurality of pixels of the same filter color located around the pixel to be corrected; and obtaining a correction value by multiplying the color signal of the pixel to be corrected and the computed other color signals by a predetermined correction coefficient and combining the products.

According to the first aspect of the present invention, when a linear matrix processing is performed on image signals before interpolation, color signals of other filter colors at the location of a pixel to be corrected are computed on the basis of the color signals of a number of pixels of the same filter color around the pixel to be corrected. This can improve color reproduction while minimizing generation of spurious signals at color boundaries of a subject.

The present invention according to a second aspect provides the color signal correcting method according to the first aspect, wherein the other color signals at the spatial location are computed by computing the average value of color signals of a plurality of pixels of the same filter color located around the pixel to be corrected.

According to the second aspect of the present invention, the other color signals at the spatial location of a pixel to be corrected is computed by computing the average value of the color signals of a number of pixels of the same filter color around the pixel to be corrected. This can improve the color reproduction while minimizing generation of spurious signals at color boundaries of a subject.

The present invention according to a third aspect provides the color signal correcting method according to the second aspect, wherein when the average value of the color signals of a plurality of pixels of the same filter color located around the pixel to be corrected is computed, the color signal of the pixel that has the greatest difference from the average value of the color signals of the other pixels among the color signals of the three or more pixels of the same filter color is excluded from the computation.

According to the third aspect of the present invention, when the average value of the color signals of a number of pixels of the same filter color around a pixel to be corrected is computed, the color signal of the pixel that has the greatest difference from the average value of the color signals of the other pixels among the color signals of the three or more pixels is excluded from the computation and the average is calculated. This can more effectively minimize generation of spurious signals at color boundaries of a subject and can further improve color reproduction.

The present invention according to a fourth aspect provides a color signal correcting apparatus for correcting a color signal of each pixel outputted from a single-plate color image pickup element having a given color filter arrangement to correct a color reproduction error in an image, including: a color signal computing device which computes color signals of filter colors other than a filter color at the spatial location of a pixel to be corrected, wherein the other color signals at the spatial location are computed on the basis of color signals of a plurality of pixels of the same filter color located around the pixel to be corrected; and a correction value computing device which obtains a correction value by multiplying the color signal of the pixel to be corrected and the other color signals computed by the color signal computing device by a predetermined correction coefficient and combining the products.

According to the fourth aspect of the present invention, when a linear matrix processing is performed on image signals before interpolation, color signals of other filter colors at the location of a pixel to be corrected are computed on the basis of the color signals of a number of pixels of the same filter color around the pixel to be corrected. This can improve color reproduction while minimizing generation of spurious signals at color boundaries of a subject.

The present invention according to a fifth aspect provides the color signal correcting apparatus according to the fourth aspect, wherein the color signal computing device computes the other color signals at the spatial location by computing the average value of color signals of a plurality of pixels of the same filter color located around the pixel to be corrected.

According to the fifth aspect of the present invention, the other color signals at the spatial location of a pixel to be corrected is computed by computing the average value of the color signals of a number of pixels of the same filter color around the pixel to be corrected. This can improve the color reproduction while minimizing generation of spurious signals at color boundaries of a subject.

The present invention according to a sixth aspect provides the color signal correcting apparatus according to the fifth aspect, wherein when computing the average value of the color signals of a plurality of pixels of the same filter color located around the pixel to be corrected, the color signal computing device excludes the color signal of the pixel that has the greatest difference from the average value of the color signals of the other pixels among the color signals of the tree or more pixels of the same filter color from the computation.

According to the sixth aspect of the present invention, when the average value of the color signals of a number of pixels of the same filter color around a pixel to be corrected is computed, the color signal of the pixel that has the greatest difference from the average value of the color signals of the other pixels among the color signals of the three or more pixels is excluded from the computation and the average is calculated. This can more effectively minimize generation of spurious signals at color boundaries of a subject and can further improve color reproduction.

The present invention according to a seventh embodiment provides a color signal correcting program for correcting a color signal of each pixel outputted from a single-plate color image pickup element having a given color filter arrangement to correct a color reproduction error in an image, the program causing a computer to function as: computing color signals of filter colors other than a filter color at the spatial location of a pixel to be corrected, wherein the other color signals at the spatial location are computed on the basis of color signals of a plurality of pixels of the same filter color located around the pixel to be corrected; and obtaining a correction value by multiplying the color signal of the pixel to be corrected and the computed other color signals by a predetermined correction coefficient and combining the products.

According to the seventh aspect of the present invention, when a linear matrix processing is performed on image signals before interpolation, color signals of other filter colors at the location of a pixel to be corrected are computed on the basis of the color signals of a number of pixels of the same filter color around the pixel to be corrected. This can improve color reproduction while minimizing generation of spurious signals at color boundaries of a subject.

The present invention according to an eighth aspect provides a color signal correcting program according to the seventh aspect, wherein the other color signals at the spatial location are computed by computing the average value of color signals of a plurality of pixels of the same filter color located around the pixel to be corrected.

According to the eighth aspect of the present invention, the other color signals at the spatial location of a pixel to be corrected is computed by computing the average value of the color signals of a number of pixels of the same filter color around the pixel to be corrected. This can improve the color reproduction while minimizing generation of spurious signals at color boundaries of a subject.

The present invention according to a ninth aspect provides a color signal correcting program according to the eighth aspect, wherein when the average value of the color signals of a plurality of pixels of the same filter color located around the pixel to be corrected is computed, the color signal of the pixel that has the greatest difference from the average value of the color signals of the other pixels among the color signals of the three or more pixels of the same filter color is excluded from the computation.

According to the ninth aspect of the present invention, when the average value of the color signals of a number of pixels of the same filter color around a pixel to be corrected is computed, the color signal of the pixel that has the greatest difference from the average value of the color signals of the other pixels among the color signals of the three or more pixels of the same filter color is excluded from the computation and the average is calculated. This can more effectively minimize generation of spurious signals at color boundaries of a subject and can further improve color reproduction.

The color signal correcting method, apparatus, and program are capable of reducing generation of spurious signals.

BRIEF DESCRIPTION OF THE DRAWINGS

FIG. 8 is a diagram illustrating a linear matrix computation on color signals of a G pixel.

DETAILED DESCRIPTION OF THE PREFERRED EMBODIMENTS

The best mode for embodying a color signal correcting method, apparatus, and program according to the present invention will be described below with reference to the accompanying drawings.

Figure 1:
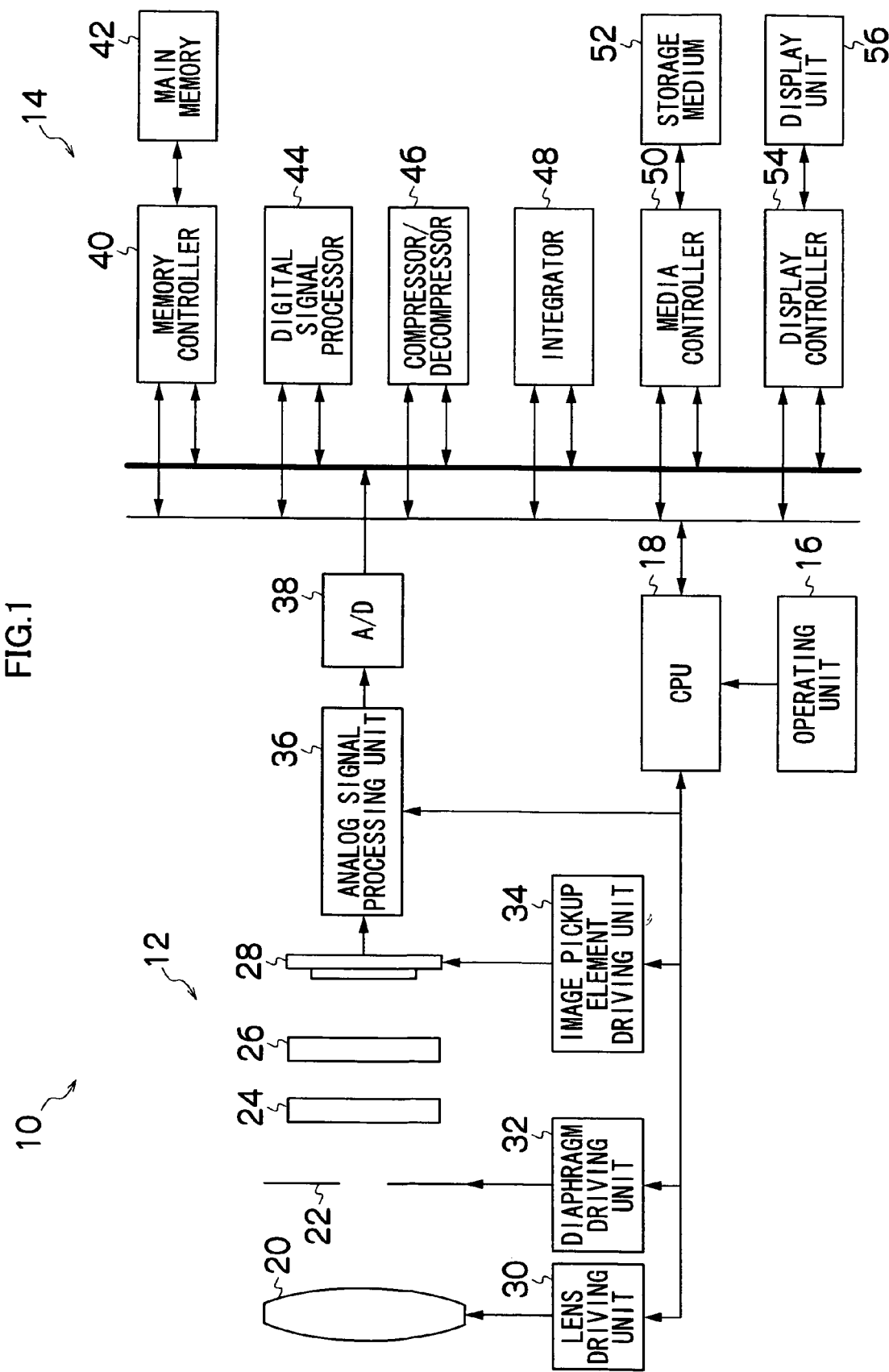
FIG. 1 is a block diagram showing an electric configuration of a digital camera to which the present invention is applied.

FIG. 1 is a block diagram showing an electrical configuration of a digital camera to which the present invention is applied. As shown, the digital camera 10 includes an imaging unit 12, a signal processing unit 14, a user operating unit 16, and a CPU 18, which centrally controls operation of the entire digital camera 10.

The user operating unit 16 includes operation buttons such as a power switch, and shutter release button and outputs signals to the CPU 18 in accordance with operation of them. The CPU 18 controls operation of the entire digital camera in response to signals from the user operating unit 16.

The imaging unit 12 includes a taking lens 20, diaphragm 22, an infrared cut filter 24, an optical low-pass filter 26, an image pickup element 28, a lens driving unit 30, a diaphragm driving unit 32, an image pickup driving unit 34, and other components.

Subject light passes through the taking lens 20, the diaphragm 22, the infrared cut filter 24, and the optical low-pass filter 26 and reaches the acceptance surface of the image pickup element 28. An infrared component of the light is filtered out by the infrared cut filter 24 and specific high-frequency components are filtered out by the low-pass filter 26 before the light reaches the acceptance surface of the image pickup element 28.

The lens driving unit 30 drives the taking lens 20 according to instructions from the CPU 18 to perform focusing and zooming.

The diaphragm driving unit 32 drives the diaphragm 22 according to instructions from the CPU 18 to control an amount of the light received by the image pickup element 28.

The image pickup driving unit 34 drives the image pickup element 28 according to instructions from the CPU 18 to control reading of signal charge.

Figure 2:
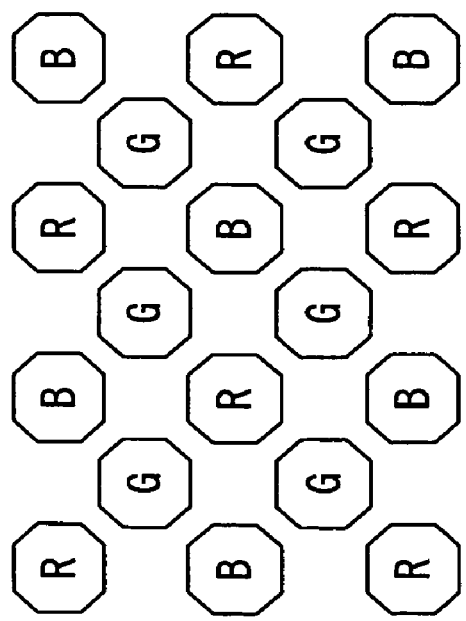
FIGS. 2A and 2B show a configuration of an image pickup element and a positional relation among signals read out.

It is assumed that a single-plate color CCD is used as the image pickup element 28 in the digital camera 10 of the present embodiment as shown in FIG. 2A. The image pickup element 28 is called a "honeycomb CCD". Many photodiodes having a green (G) color filter are vertically and horizontally arranged a given distance apart. Photodiodes having a blue (B) color filter and photodiodes having red (R) color filer are alternately provided at ½-pitch sifted positions between photodiodes of each raw and column. In the example shown, octagonal frames labeled "R", "G", and "B" represent red, green and blue color filters, respectively. The photodiodes associated with these filters are provided under them. To be more precise, the octagonal frames represents the shape of the photodiodes and the red, green, and blue color filters (octagonal or rectangular in shape) are larger than the octagonal frames.

Signal charge accumulated in each photodiode by light entering through the color filter is read out into a vertical transfer line (not shown) formed alongside the photodiodes, reaches a horizontal transfer line (not shown) from the vertical transfer line, transferred over the horizontal transfer line, and is read out from the image pickup element. FIG. 2B shows an arrangement of the color signals of each pixel read out from the image pickup element 28 where the amount of signal charge read out from each pixel has a value which depends on the amount of light received by each photo diode.

The signal processing unit 14 includes an analog signal processor 36, an A/D converter 38, a memory controller 40, a main memory 42, a digital signal processor 44, a compressor/decompressor 46, an integrator 48, a media controller 50, a storage medium 52, a display controller 56, display unit 56 and other components.

The analog signal processor 36 applies correlated double sampling (processing in which the difference between a feedthrough component level and an image signal component level contained in output signal from each pixel of the image pickup element is computed in order to reduce noise (especially thermal noise) contained in the output signal from the image pickup element, whereby obtaining more accurate image data) to dot sequential image signals sequentially outputted from the image pickup element 28, amplifies the signals and outputs them.

The A/D converter 38 converts an analog image signal outputted from the analog signal processor 36 into a digital image signal and outputs it.

The memory controller 40 controls write and read of data in and from the main memory 42. A digital image signal outputted from the A/D converter 38 is stored in the main memory 42 through the memory controller 40.

The digital signal processor 44 applies required signal processing to an inputted image signal to generate image data consisting of a luminance signal Y and color-difference signal (Cr, Cb) under the control of the CPU 18. The signal processing in the digital signal processor 44 will be detailed later.

The compressor/decompressor 46 compresses inputted image data according to an instruction from the CPU 18 to generate compressed image data in a predetermined format (for example JPEG). It also decompresses inputted compressed image data to generate decompressed digital image data.

The integrator 48 divides one screen into areas (for example 16×16 areas) and computes integrated values of R, G, and B image signals for each of the areas. The CPU 18 detects the brightness of a subject (subject brightness) on the basis of the integrated values provided by the integrator 48 and computes an exposure value (taking EV value) suitable for taking. The CPU 18 determines an aperture and shutter speed from the computed taking EV value and a given program diagram. It also computes the ratio of R to G and the ratio of B to G in each area from the integrated value of R, the integrated value of B, and the integrated value of G, and determines the type of a light source on the basis of the distributions of the computed R-G and B-G ratios in R/G and B/G color spaces. Then, the CPU 18 determines the gain of white balance gain for R, G, and B signals according to a white balance adjustment value suitable for the determined type of light source so that the each ratio value becomes 1 (namely the integrated ratio of GB in one screen R:G:B≦1: 1:1).

The media controller 50 controls write and read of data to be recorded in the storage medium 52 according to an instruction from the CPU 18.

The display controller 54 controls display on the display unit 56 according to an instruction from the CPU 18.

Figure 3:
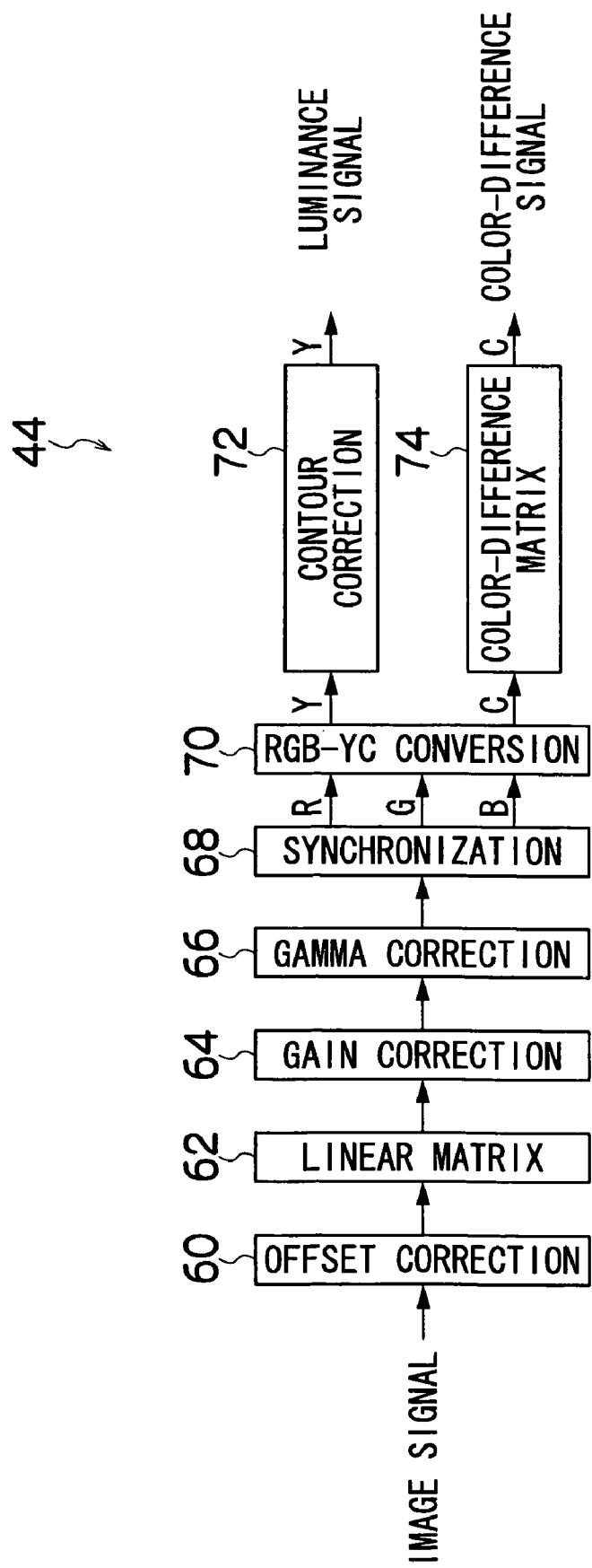
FIG. 3 is a block diagram showing a configuration of a digital signal processor.

FIG. 3. is a block diagram showing a configuration of the digital signal processor 44. As shown in FIG. 3, the digital signal processor 44 includes an offset correction circuit 60, a linear matrix processing circuit 62, a gain correction circuit 64, a gamma correction circuit 66, a synchronization circuit 68, an RGB-YC conversion circuit 70, a contour correction circuit 72, and a color-difference matrix processing circuit 74.

The offset correction circuit 60 applies offset correction to dot sequential R, G, and B signals read out into the main memory 42 to adjust black balance.

The linear matrix processing circuit 62 corrects a color reproduction error by applying a linear matrix computation to gain-corrected dot sequential R, G, and B signals. Details of the processing in the linear matrix processing circuit 62 will be described later.

The gain correction circuit 64 applies gain correction to offset-corrected dot sequential R, G, and B signals to correct white balance.

The gamma correction circuit 66 applies gamma correction to dot sequential R, G, and B signals outputted from the linear matrix processing circuit 62 to correct tone.

The synchronization circuit 68 interpolates spatial displacements of color signals, which are inherent in the color filter arrangement of single-plate image pickup elements, to generate RGB color signals at each pixel location. That is, in a single-plate image pickup element, only one of R, G, B signals is outputted from one pixel. Therefore, the degrees of the other color signals, for example G and B signals for a pixel that outputs an R signal, are obtained from G and B signals at neighboring pixels by an interpolation computation, thereby generating RGB color signals at the pixel.

The RGB-YC conversion circuit 70 converts R, G, and B signals synchronized by the synchronization circuit 68 into a luminance signal Y and color-difference signal C (Cr, Cb).

The contour correction circuit 72 applies contour correction to a luminance signal Y generated by the RGB-YC conversion circuit 70. The color-difference matrix processing circuit 74 performs a given color-difference matrix computation on a color-difference signal generated by the RGB-YC conversion circuit 70 to correct gradation.

Figure 4:
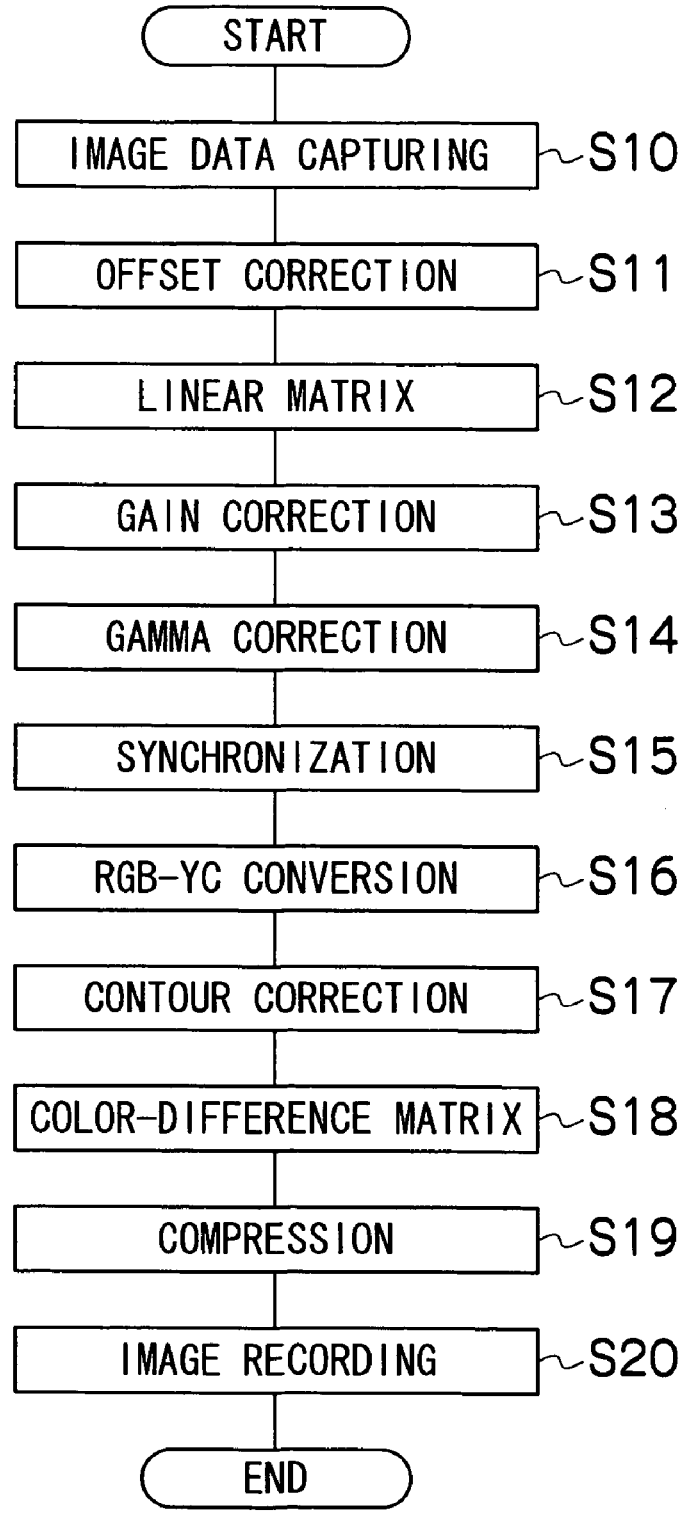
FIG. 4 is a flowchart showing a flow of image signal processing.

FIG. 4 is a flowchart showing a flow of image signal processing, from taking in an image to recording of the image in a storage medium.

An image signal outputted from the image pickup element 28 by image capturing is placed in the main memory 42 through the analog processor 36 and the A/D converter 38 (step S10). The image signal placed in the main memory 42 is provided to the digital signal processor 44, undergoes offset correction in the offset correction circuit 60 (step S11), an linear matrix computation in the linear matrix processing circuit 62 (step S12), gain correction in the gain correction circuit 64 (step S13), and gamma correction in the gamma correction circuit 66 (step S14), then synchronization in the synchronization circuit 68 (step S15), thus an RGB color signals is generated at each pixel location. The synchronized RGB color signal is converted into a luminance signal Y and a color-difference signal in the RGB-YC conversion circuit 70 (step S16). Contour correction is applied to the generated luminance signal Y in the contour correction circuit 72 (step S17) and a color-difference matrix computation is performed on the color-difference signal C in the color-difference matrix processing circuit 74 (step S18). The luminance signal Y and color-difference signal C-to which the contour correction and color-difference matrix computation have been applied are provided to the compressor/decompressor 46, where they are compressed (step S19). Then, the compressed signals are stored in the storage medium 52 through the media controller 50.

As has been described, the linear matrix processing circuit 62 of the digital camera 10 according to the present embodiment performs color reproduction error correction by performing a linear matrix computation on dot sequential R, G, and B signals. The linear matrix computation is accomplished by performing a matrix computation on each of the R, G, and B signals as the following equation.

On the R signal, $$[R'] = [a \ b \ c] \begin{pmatrix} R \\ G \\ B \end{pmatrix} \quad \text{[Formula 2]}$$

On the G signal, $$[G'] = [d \ e \ f] \begin{pmatrix} R \\ G \\ B \end{pmatrix} \quad \text{[Formula 3]}$$

On the B signal, $$[B'] = [g \ h \ i] \begin{pmatrix} R \\ G \\ B \end{pmatrix} \quad \text{[Formula 4]}$$

In this way, to correct the color signal of each pixel, the linear matrix computation requires information on other color signals, in addition to the information on that color signal. (For example, for the color signal (R signal) of a pixel whose the filter color is red, B and G color signals are also required.)

Therefore, the linear matrix processing circuit 62 of the digital camera 10 in the present embodiments interpolates information on color signals other than the color signal of the pixel to be corrected, on the basis of color signals of pixels located around the pixel to be corrected. That is, the average value of color signals of pixels located around the pixel to be corrected, more specifically, the pixels located on the smallest concentric circle around the pixel to be corrected is obtained, and the average is used as information on the other color signals at the location of the pixel to be corrected.

Figure 5:
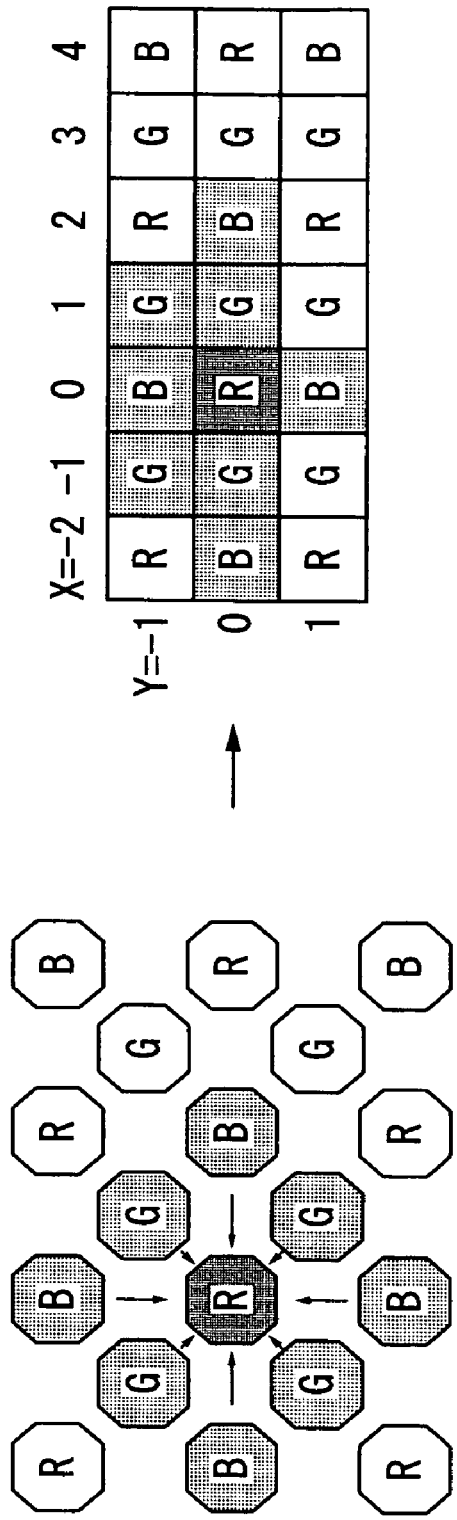
FIG. 5 is a diagram illustrating a linear matrix computation on color signals of an R pixel.

For example, if an linear matrix computation is performed for the color signal (R signal) of pixel $R_{0,0}$ located at (X=0, Y=0) (a pixel whose filter color is red) as shown in FIG. 5, the color signals other than the R signal, namely the G and B signals, are obtained by averaging the color signals of the G pixels (pixels whose filter color is green) and B pixels (pixels whose filter color is blue) located around pixel $R_{0,0}$.

In particular, the G signal is obtained by computing the average $G_{ave}$ of the color signals of pixel $G_{-1,-1}$ located at (X=−1, Y=−1), pixel $G_{1,-1}$ located at (X=1, Y=−1), pixel $G_{-1,0}$ located (X=−1, Y=0), and pixel $G_{1,0}$ located at (X=1, Y=0) [$G_{ave}=(G_{-1,-1}+G_{1,-1}+G_{-1,0}+G_{1,0}/4$].

The B signal is obtained by computing the average $B_{ave}$ of the color signal of pixel $B_{0,-1}$ located at (X=0, Y=−1), the color signals of pixel $B_{-2,0}$ located at (X=−2, Y=0), pixel $B_{2,0}$ located at (X=2, Y=0), and pixel $B_{0,1}$ located at (X=0, Y=1) [$B_{ave}=(B_{0,-1}+B_{-2,0}+B_{2,0}+B_{0,1})/4$].

Then, the G signal ($G_{ave}$) and B signal ($B_{ave}$) and the color signal of the pixel to be corrected (R signal) are used to perform the matrix computation given in Formula 1 to obtain a correction signal (R' signal).

Figure 6:
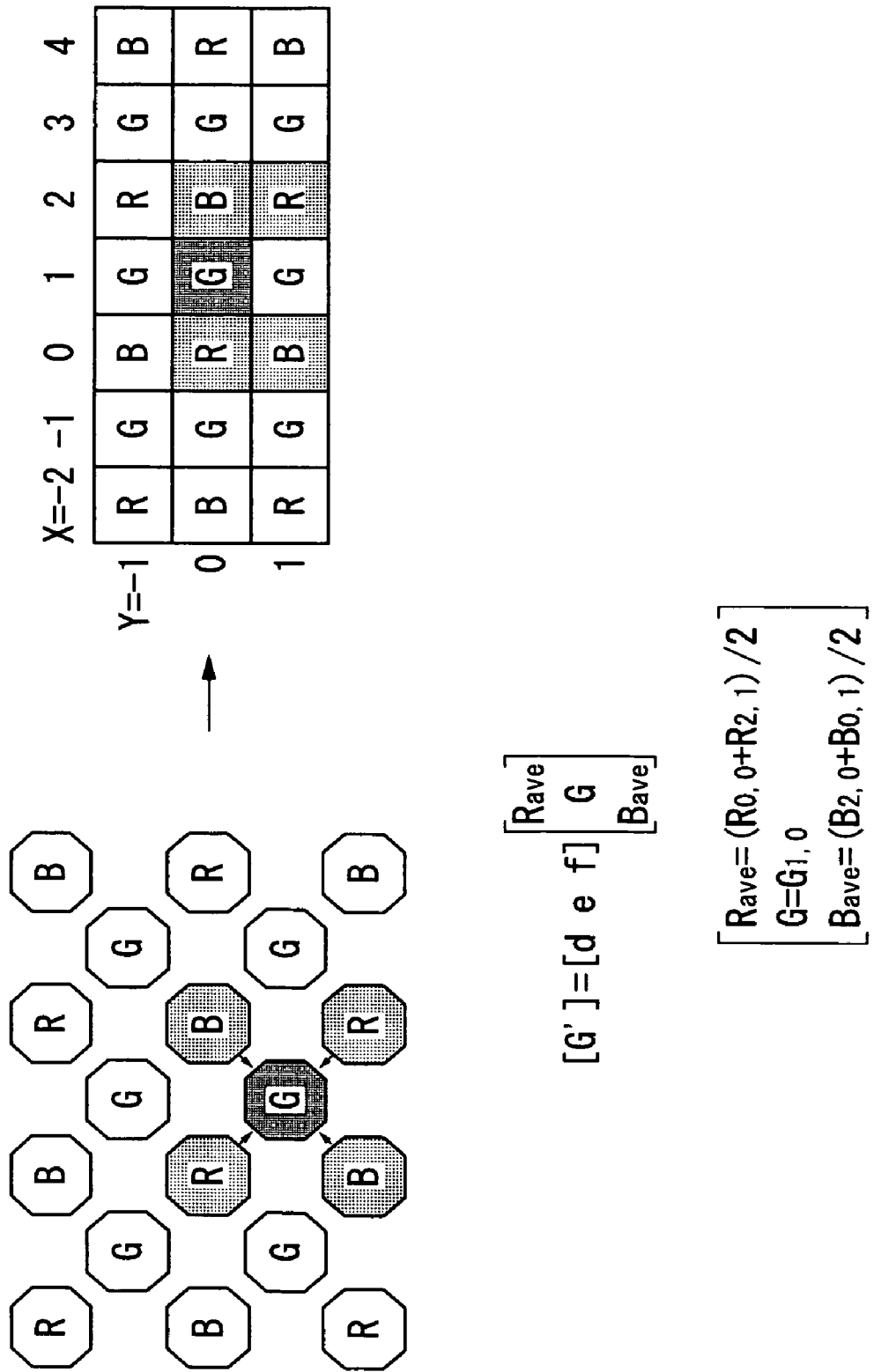
FIG. 6 is a diagram illustrating a linear matrix computation on color signals of a G pixel.

Furthermore, if a linear matrix computation is performed for the color signal (G signal) of pixel $G_{1,0}$ located at (X=1, Y=0) as shown in FIG. 6, the color signals other than the G signal, namely the R and B signals, are obtained by averaging the color signals of the R and B pixels located around pixel $G_{1,0}$.

In particular, the R signal is obtained by computing the average $R_{ave}$ of the color signals of pixel $R_{0,0}$ located at (X=0, Y=0) and pixel $R_{2,1}$ located at (X=2, Y=1) [$R_{ave}=(R_{0,0}+R_{2,1})/2$].

The B signal is obtained by computing the average $B_{ave}$ of the color signals of pixel $B_{2,0}$ located at (X=2, Y=0) and pixel $B_{0,1}$ located at (X=0, Y=1) [$B_{ave}=(B_{2,0}+B_{0,1})/2$].

Then, the obtained R signal ($R_{ave}$) and B signal ($B_{ave}$) and the color signal of the pixel to be corrected (G signal) are used to perform the matrix computation given in Formula 3 to obtain a correction signal (G' signal).

Figure 7:
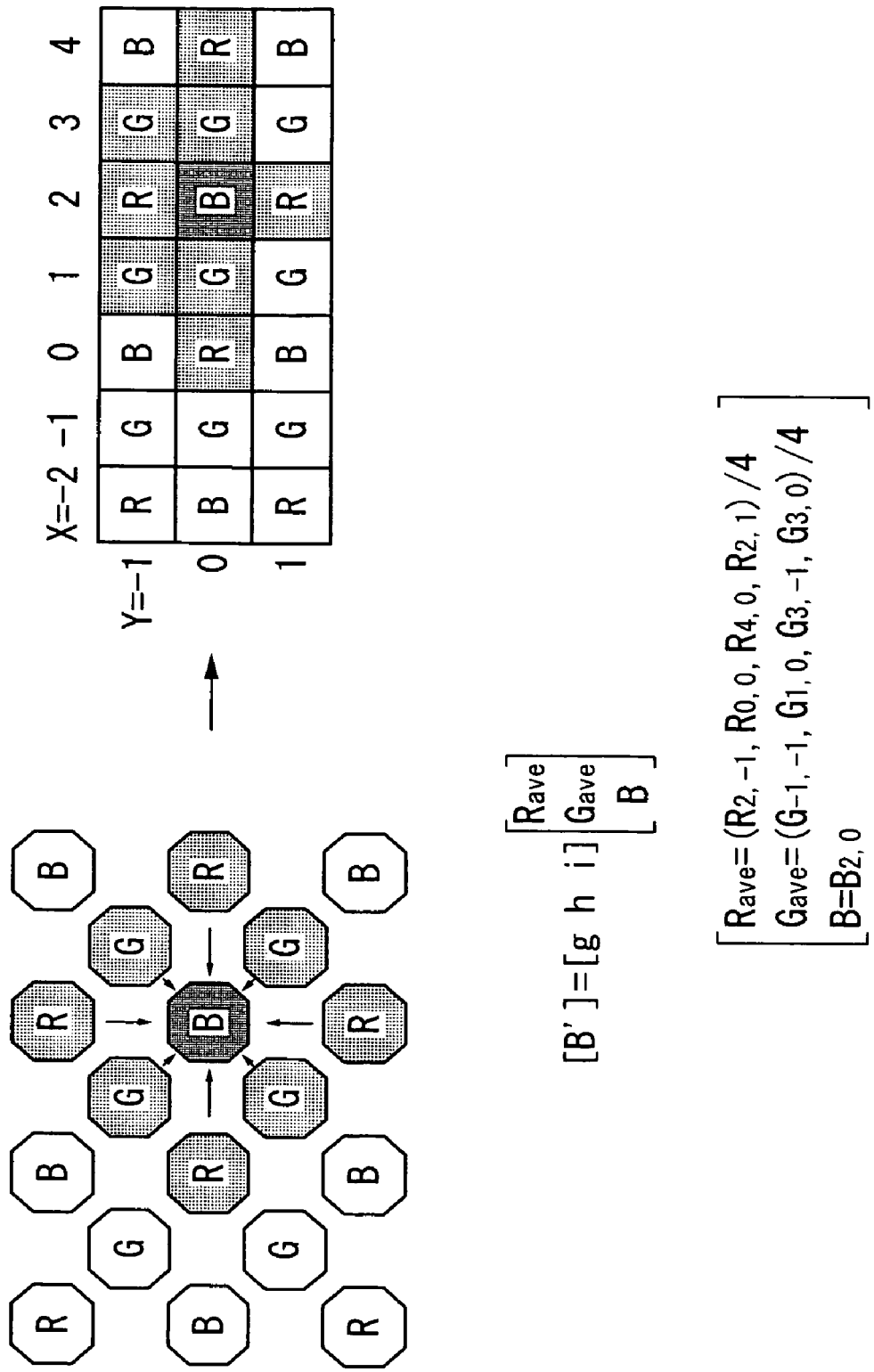
FIG. 7 is a diagram illustrating a linear matrix computation on color signals of a B pixel.

Furthermore, if a linear matrix computation is performed for the color signal (B signal) of pixel $B_{2,0}$ located at (X=2, Y=0) as shown in FIG. 7, the color signals other than the B signal, namely the R and G signals are obtained by averaging the color signals of the R and G pixels located around pixel $B_{2,0}$.

In particular, the R signal is obtained by computing the average Rave of the color signals of $R_{2,-1}$ pixel located at (X=2, Y=−1), pixel $R_{0,0}$ located at (X=0, Y=0), pixel $R_{4,0}$ located at (X=4, Y=0), pixel $_{2,1}$ located at (X=2, Y=1) [$R_{ave}=R_{2,-1}+R_{0,0}+R_{4,0}+R_{2,1})/4$].

The G signal is obtained by computing the average $B_{ave}$ of the color signals of pixel $G_{1,-1}$ located at (X=1, Y=−1), pixel $G_{1,0}$ located at (X=1, Y=0), pixel $G_{3,-1}$ located at (X=3, Y=−1), and pixel $G_{3,0}$ located at (X=3, Y=0) [$B_{ave}=(G_{1,-1}+G_{1,0}+G_{3,-1}+G_{3,0})/4$].

Then, the obtained R signal ($R_{ave}$) and G signal ($G_{ave}$) and the color signal of the pixel to be corrected (B signal) are used to perform the matrix computation given in Formula 4 to obtain a correction signal (B' signal).

Furthermore, as shown in FIG. 8, if a linear matrix computation is performed for the color signal (G signal) of pixel $G_{3,0}$ located at (X=3, Y=0), the color signals other than the G signal, namely the R and B signals are obtained by averaging the color signal of the R and B pixels located around $G_{3,0}$ pixel.

In particular, the R signal is obtained by computing the average $R_{ave}$ of the color signals of $R_{4,0}$ pixel located at (X=4, Y=0) and pixel $R_{2,1}$ located at (X=2, Y=1) [$R_{ave}$=($R_{4,0}$+$R_{2,1}$)/2].

The B signal is obtained by computing the average $B_{ave}$ of the color signals of pixel $B_{2,0}$ located at (X=2, Y=0) and pixel $B_{4,1}$ located at (X=4, Y=1) [$B_{ave}$=($B_{2,0}$+$B_{4,1}$)/2].

Then, the obtained R signal ($R_{ave}$) and B signal ($B_{ave}$) and the color signal of the pixel to be corrected (G signal) are used to perform the matrix computation given in Formula 3 to obtain a correction signal (G' signal).

Thus, the linear matrix processing circuit 62 of the digital camera 10 in the present embodiment computes the color signals of filter colors other than the filter color at the spatial location of a pixel to be corrected, on the basis of the color signals of a number of pixels of the same filter color located around the pixel to be corrected to interpolate the color signals other than the color signal of the pixel to be corrected, and performs a linear matrix computation. This can effectively minimize generation of spurious signals at color boundaries of a subject and improve the color reproduction.

While the color signals of filter colors other than the filter color at the spatial location of a pixel to be corrected are obtained by computing the average value of the color signals of a number of pixels of the same filter color that are located around the pixel to be corrected, the average value is preferably computed as follows. If there are more than two pixels that would be involved in the computation, the color signal of the pixel that has the greatest difference Q from the average values of the color signals of the other pixels is excluded from the averaging and the average of the remaining color signals is computed.

For example, if the G signal of pixel $R_{0,0}$ located at (X=0, Y=0) in FIG. 5 is to be computed, four pixels, pixel $G_{-1,-1}$ located at (X=-1, Y=-1), pixel $G_{1,-1}$ located at (X=1, Y=-1), pixel $G_{-1,0}$ located at (X=-1, Y=0), and pixel $G_{1,0}$ located at (X=1, Y=0) would be involved in the computation. In this case, the color signal of the pixel that has the greatest difference Q from the average value of the color signals of the other pixels is excluded from the averaging and the average of the remaining color signals is computed. That is, the color signal of the pixel $G_{i,j}$ that has the greatest difference among the following differences $Q_{i,j}$, $$Q_{-1,-1}=|(G_{1,-1}+G_{-1,0}+G_{1,0})/3-G_{-1,-1}|$$

$$Q_{1,-1}=|(G_{-1,-1}+G_{-1,0}+G_{1,0})/3-G_{1,-1}|$$

$$Q_{-1,0}=|(G_{-1,-1}+G_{1,-1}+G_{1,0})/3-G_{-1,0}|$$

$$Q_{1,0}=|(G_{-1,-1}+G_{1,-1}+G_{-1,0})/3-G_{1,0}|$$

is excluded from the averaging. For example, if $Q_{-1,-1}$ is the greatest among the four differences $Q_{i,j}$, $G_{-1,-1}$ is excluded from the averaging and the average of the remaining color signals is computed. Thus, the G signal is computed as $G_{ave}$=($G_{1,-1}$+$G_{-1,0}$+$G_{1,0}$)/3.

In this way, if more than two pixels to be computed would be involved in averaging, the color signal of the pixel that has the greatest difference from the average value of the color signals of the other pixels is excluded from the averaging and the average of the remaining color signals is computed. This can effectively minimize generation of spurious signals at color boundaries and improve the color reproduction.

While the present embodiment has been described with respect to an example in which the present invention is applied to a digital camera, the present invention is not so limited. The present invention can be applied to any camera apparatus, such as a cellular phone with built-in camera and a video camera, that includes a single-panel color image pickup element, as well as any image processing apparatus that processes image data captured by a single-panel color image pickup element. Furthermore, the present invention can be implemented as a program executed on a computer such as a personal computer.

While the present embodiment has been described with respect to processing of image signals captured by a honeycomb CCD, the present invention can be applied to image signals captured by an image pickup element (such as a CCD and CMOS) having other color filter arrangement.

What is claimed is:

1. A color signal correcting method for correcting a color signal of each pixel outputted from a single-plate color image pickup element having a given color filter arrangement before synchronization of interpolating spatial displacements of color signals, which are inherent in the color filter arrangement of single-plate image pickup elements, to generate RGB color signals at each pixel location to correct a color reproduction error in an image, comprising the steps of:
   computing color signals of filter colors other than a filter color at the spatial location of a pixel to be corrected, wherein the other color signals at the spatial location are computed on the basis of color signals of a plurality of pixels of the same filter color located around the pixel to be corrected; and
   obtaining a correction value by multiplying the color signal of the pixel to be corrected and the computed other color signals by a predetermined correction coefficient and combining the products;
   wherein the other color signals at the spatial location are computed by computing the average value of color signals of a plurality of pixels of the same filter color located on the smallest concentric circle around the pixel to be corrected;
   wherein the step of computing color signals of filter colors other than a filter color at the spatial location of a pixel to be corrected, and the step of obtaining a correction value, produce gain-corrected dot sequential RGB color signals prior to color interpolation to generate one RGB per pixel.

2. The color signal correcting method according to claim 1, wherein when the average value of the color signals of a plurality of pixels of the same filter color located around the pixel to be corrected is computed, the color signal of the pixel that has the greatest difference from the average value of the color signals of the other pixels among the color signals of the three or more pixels of the same filter color is excluded from the computation.

3. A color signal correcting apparatus for correcting a color signal of each pixel outputted from a single-plate color image pickup element having a given color filter arrangement before synchronization of interpolating spatial displacements of color signals, which are inherent in the color filter arrangement of single-plate image pickup elements, to generate RGB color signals at each pixel location to correct a color reproduction error in an image, comprising:
   a color signal computing device which computes color signals of filter colors other than a filter color at the spatial location of a pixel to be corrected, wherein the other color signals at the spatial location are computed on the basis of color signals of a plurality of pixels of the same filter color located around the pixel to be corrected; and a correction value computing device which obtains a correction value by multiplying the color signal of the pixel to be corrected and the other color signals computed by the color signal computing device by a predetermined correction coefficient and combining the products;

wherein the color signal computing device computes the other color signals at the spatial location by computing the average value of color signals of a plurality of pixels of the same filter color located on the smallest concentric circle around the pixel to be corrected;

wherein the color signal computing device computes color signals of filter colors other than a filter color at the spatial location of a pixel to be corrected and obtains a correction value to produce gain-corrected dot sequential RGB color signals prior to color interpolation to generate one RGB per pixel.

4. The color signal correcting apparatus according to claim 3, wherein when computing the average value of the color signals of a plurality of pixels of the same filter color located around the pixel to be corrected, the color signal computing device excludes the color signal of the pixel that has the greatest difference from the average value of the color signals of the other pixels among the color signals of the three or more pixels of the same filter color from the computation.

5. A computer-readable medium encoded with a color signal correcting program for correcting a color signal of each pixel outputted from a single-plate color image pickup element having a given color filter arrangement before synchronization of interpolating spatial displacements of color signals, which are inherent in the color filter arrangement of single-plate image pickup elements, to generate RGB color signals at each pixel location to correct a color reproduction error in an image, the program causing a computer to function as:

computing color signals of filter colors other than a filter color at the spatial location of a pixel to be corrected, wherein the other color signals at the spatial location are computed on the basis of color signals of a plurality of pixels of the same filter color located around the pixel to be corrected; and obtaining a correction value by multiplying the color signal of the pixel to be corrected and the computed other color signals by a predetermined correction coefficient and combining the products;

wherein the other color signals at the spatial location are computed by computing the average value of color signals of a plurality of pixels of the same filter color located on the smallest concentric circle around the pixel to be corrected;

wherein the other color signals at the spatial location are computed by computing color signals of filter colors other than a filter color at the spatial location of a pixel to be corrected and obtaining a correction value to produce gain-corrected dot sequential RGB color signals prior to color interpolation to generate one RGB per pixel.

6. The computer-readable medium encoded with a color signal correcting program according to claim 5, wherein when the average value of the color signals of a plurality of pixels of the same filter color located around the pixel to be corrected is computed, the color signal of the pixel that has the greatest difference from the average value of the color signals of the other pixels among the color signals of the three or more pixels of the same filter color is excluded from the computation.

* * * * *